Patented May 2, 1939

2,156,718

UNITED STATES PATENT OFFICE 2,156,718

POLYMERIZATION OF OLEFINS

Franklin A. Bent, Russell W. Millar, and Simon N. Wik, Berkeley, Calif., assignors to Shell Development Company, San Francisco, Calif., a corporation of Delaware No Drawing. Application December 23, 1935, Serial No. 55,832

6 Claims. (Cl. 260—683)

This invention relates to the manufacture of higher boiling branched chain hydrocarbons by polymerization of olefins containing an unsaturated tertiary carbon atom and/or inter-polymerization between such as olefin or olefins with a dissimilar olefin or olefins. It deals particularly with a novel method for carrying out such reactions whereby the polymerization may be more accurately controlled to yield products of definite composition, for example, preponderantly dimers or trimers, etc., or mixtures of predictable proportions. The invention is especially concerned with the production of hydrocarbons of high anti-knock value capable of use as fuels or as components of fuel mixtures, etc.

It has long been known that olefin polymers, including tertiary olefin polymers, may be produced by absorption of the corresponding olefin or olefins in a relatively strong mineral acid solution, for example a 60–95% $H_2SO_4$ solution, and heating the resulting absorption product to about 100° C. As a commercial source of tertiary olefin polymers, such, for example, as di-isobutylene which may be converted to iso-octane by hydrogenation, this procedure has several fundamental objections in addition to involving a multiplicity of steps as well as the repeated pumping of corrosive acid. Particularly unfortunate is the fact that acid concentrations adapted for carrying out the absorption step are unsuited for the optimum production of a single polymer and always give mixed products as a result. While the formation of higher polymers may be greatly reduced by dilution of the absorption product prior to carrying out the polymerization step this necessitates re-concentration of the acid before it may be returned to the absorption cycle greatly increasing the cost of manufacture.

We have now found that such polymerizations may be carried out much more economically and with ready control of the composition of the product without resort to a tertiary olefin absorption step. The process of our invention essentially comprises contacting the tertiary olefin containing material to be polymerized with a suitable acid-acting catalyst solution of an acid concentration not greater than 50% by weight at a pressure and an elevated temperature and for a time at which formation of lower polymerization products is favored.

Our process may be applied to any tertiary base olefin or olefins or olefinic mixture containing such an olefin or olefins regardless of its source or other constituents. Thus, tertiary olefins in a pure state either as individual tertiary olefins or pure mixtures of tertiary olefins or such tertiary olefin or olefins in admixture with paraffins and/or other compounds including other olefins which may or may not undergo polymerization or other change under the reaction conditions, may be present. For example, ethylene and/or secondary olefins such as propylene, 1-butene, 2-butene, 1-pentene, 2-pentene, 3-methyl-1-butene, and the like, may be present with the tertiary-base olefin or olefins used. Suitable sources of tertiary olefins or tertiary olefin containing mixtures which may be used in our process are hydrocarbons derived from mineral oils, as petroleum products, shale oil, and the like, or natural gas, or from coal, peat and like carboniferous natural materials as well as animal or vegetable oils, fats and waxes. The olefins present in such starting material may be of natural occurrence, the result of a dehydrogenation, distillation, liquid or vapor phase cracking, or other pyrogenetic treatment. Alternatively, the olefins may be obtained by dehydration of the corresponding alcohols. Olefinic mixtures may be used as produced or advantageously after separation into tertiary olefin containing fractions consisting of, or predominating in, hydrocarbons containing the same number of carbon atoms to the molecule.

The process is particularly well adapted to the production of lower polymers, especially dimers, of 2-methyl propene and/or 2-methyl-1-butene and/or 2-methyl-2-butene. It may also be used for the preparation of polymers of other tertiary olefins such as the tertiary hexylenes, and the like. It is applicable, furthermore, to the formation of inter-polymerization products of such tertiary olefins with dissimilar olefins, whether containing a tertiary unsaturated carbon atom or not, such as are described in copending application of Deanesly and Wachter, Serial No. 37,942, filed August 26, 1935.

Suitable catalysts which may be used in our process are compounds capable of yielding catalytic acid ions in the presence of water, including, for example, inorganic acids such as sulfuric, phosphoric, hydrochloric and like acids, or organic acids as benzene sulfonic, naphthalene sulfonic, or acid-acting salts of which sodium bisulfate, zinc chloride, copper sulfate and copper chloride are typical, or salts of organic nitrogen bases such as pyridine sulfate, quinoline phosphate and the like described more fully in copending application Serial No. 735,848 filed July 18, 1934, wherein their use as olefin hydration agents is claimed. Such acid-acting catalysts may be employed alone or in admixture with other materials which may or may not be themselves tertiary olefin polymerizing agents, thus, for example, a mixture of free acid and the corresponding salt of a nitrogen base is particularly advantageous because it materially reduces the corrosion of the polymerizing equipment.

The catalysts used in our process are employed as solutions or suspensions of acid reaction. The concentrations in which such acid-acting catalysts are employed may vary depending upon the tertiary olefin or olefins to be polymerized, their concentration, particularly with relation to that of other olefins which may be present, the temperature and pressure at which the polymerization is carried out, etc. Thus, in general, where the polymerization of a tertiary olefin or olefins is to be carried out selectively in the presence of ethylene and/or a secondary olefin or olefins lower acid catalyst concentrations and/or less drastic temperature conditions are permissible than where such olefins are to be co-polymerized. In general we prefer to use acid concentrations lower than those which are suitable for the formation of absorption products of the olefin or olefins involved at practical rates. Thus with mineral acids such as sulfuric acid, for example, we preferably employ solutions containing less than 50% of acid by weight on a hydrocarbon free basis as control of the polymerization and avoidance of undesirable higher polymers is facilitated thereby. But it will be understood that since the factors of acid concentration, temperature of operation and rate of olefin thruput are inter-dependent variables, acid concentrations higher than 50% may be used provided suitable adjustment of the other conditions, particularly time of contact between olefin and acid solution, is made. Concentrated acids are however, always to be avoided and we find it usually most practical to operate at temperatures above 100° C., and more advantageously of 125° C., and above, using mineral acid concentrations of about 0.5% to about 45% or more preferably of about 1% to about 25%. Particularly good results may be obtained with isobutylene, for example, using sulfuric acid concentrations of about 3% to about 10% at temperatures within the range of about 150° to about 250° C. In order to maintain water in the liquid phase the critical temperature for water cannot be exceeded. The polymerization rate increases with the temperature but we prefer to operate at below about 350° C. as at temperatures substantially higher the amount of water which must be introduced into the reaction vessel to compensate for that lost by evaporation and maintain the acid concentration substantially constant within the desired limits, becomes excessive. Where inter-polymerization of a tertiary olefin with ethylene or a secondary olefin or olefins is to be carried out, using preferably a substantial excess of non-tertiary olefin, somewhat higher temperatures are usually more desirable than those used for reactions involving tertiary base olefins only. A temperature within the range of about 200° to about 250° C., is particularly suitable for the selective polymerization of isobutylene in the presence of secondary butylenes.

The process is usually carried out at superatmospheric pressures, the working lower limit in any case being a pressure equal to the vapor pressure of water at the operating temperature so that water will be always present in the liquid phase and the olefin mixture may be forced into the reaction vessel. The practical operating pressure should be materially higher however, in order to minimize the amount of water replacement required to maintain the acid catalyst concentration within the desired limits. Increased pressure favors the polymerization and permits increased thruput, resulting in greater mechanical efficiency of the apparatus employed. Pressures as high as 10,000 lbs./sq. in. may be resorted to. The polymerization may be carried out with the tertiary olefin or tertiary olefin containing mixture in either the liquid, vapor or mixed liquid vapor state. Contact with the desired acid-acting catalyst may be effected in any suitable manner. For example, the tertiary olefin containing material may be agitated in contact with the acid-acting catalyst in a common vessel at the desired pressure for the required length of time and the reacted mixture withdrawn for separation of the polymerization product, or the tertiary olefin containing material may be forced into a heated pressure-proof vessel containing a solution or suspension of the acid-acting catalyst thru which the olefin may bubble or otherwise be contacted and the polymer formed together with any unreacted olefin which may be present and water vapor may be withdrawn from the top of the vessel and separated by stratification or the like, or other methods of batch, continuous or intermittent operation may be adopted.

The optimum time of contact between the tertiary olefin containing material and the catalyst will vary depending upon the character of the olefin or olefins involved and the other operating conditions chosen. While somewhat longer times of contact may be advantageous for inter-polymerization reactions than are required for simple tertiary olefin polymerizations, we generally find quite short times of contact may be used satisfactorily. In any case excessive times of contact and/or other drastic operating conditions leading to the formation of undesirable higher polymers of a tarry nature are preferably avoided. Where inter-polymerization reactions are being carried out, between a tertiary olefin or olefins and ethylene and/or one or more secondary olefins the presence of an excess of the latter is desirable.

While our invention is thus susceptible to considerable variation and modification in the manner of its practical application, the following detailed description of one of its applications to the production of di-isobutylene will serve to illustrate how the invention may be practiced.

Isobutylene or, for example, a butane-butylene fraction of cracked petroleum oil containing isobutylene is passed under pressure thru an aqueous acid-acting catalyst solution in a polymerization vessel maintained at reaction temperature. With the isobutylene there is preferably also fed part of the totally condensed effluent material from the polymerizer predominantly comprising the stratified aqueous phase and unconverted isobutylene. The polymerizer feed is preferably preheated by countercurrent heat exchange with the polymerizer effluent and then brought up to the desired reaction temperature in a second preheater before admission to the polymerizer. The mixture of vapors and liquid water is bubbled thru the sulfuric acid solution which is maintained at a predetermined level in the polymerizing vessel by suitable replacement of any water removed from the system so a constant time of contact between the isobutylene and acid is provided. We have found that the total volume of acid catalyst in the liquid phase as well as its concentration materially effects the tertiary olefin conversion and the composition of the resulting polymers. For this reason we prefer to directly introduce liquid water into the polymerizer to replace that withdrawn from the system but such make-up water may also be added as steam or otherwise at other points. The polymerizer feed is preferably introduced at or near the bottom of the liquid catalyst so that the full time of contact may be availed of. The reaction products and water vapor issue from the polymerizer and are conducted, preferably via the feed heat interchanger above referred to, to a pressure condenser wherein total condensation of the material is effected by cooling. From the condenser the polymerizer effluent is run to a separator maintained at the vapor pressure of the mixture at substantially room temperature. Two liquid phases appear, the lower layer containing principally water together with a small amount of tertiary butyl alcohol and the upper layer comprising the polymer product, unconverted isobutylene and tertiary butyl alcohol. The aqueous layer is returned in toto to the polymerizer while the polymer layer is suitably fractionated to separate the unconverted isobutylenes and tertiary butyl alcohol. The unconverted isobutylene and if desired, the tertiary butyl alcohol may be added to the polymerizer feed. If the tertiary butyl alcohol is returned to the system it will eventually build up to equilibrium concentration in the effluent and inhibit, in accordance with the mass action law, further alcohol formation. It is frequently more economically advantageous to recover the tertiary alcohol formed as a valuable by-product.

Typical results obtained in one pass under a variety of different operating conditions are given in the following table:

| | | | |
|---|---|---|---|
| Reactor temperature °C | 225 | 220–225 | 150 |
| Total pressure lbs. gauge | 3,000 | 400 | 3,000 |
| Concentration of $H_2SO_4$ in catalyst percent | 4.52 | 20.8 | 20.8 |
| Volume of catalyst at 25° C cc | 1,640 | 1,000 | 910 |
| Rate of isobutylene feed mols/min | 3.04 | 2.02 | 1.68 |
| Composition of aqueous phase of effluent: | | | |
| Water percent by weight | 89.2 | 96.4 | 91.6 |
| Tertiary butyl alcohol percent by weight | 10.8 | 3.6 | 8.4 |
| Polymer do | Trace | Trace | Trace |
| Composition of polymer phase of effluent: | | | |
| Isobutylene percent by weight | 71.8 | 95.1 | 93.1 |
| Di-isobutylene do | 17.8 | 3.4 | 3.0 |
| Tri-isobutylene do | 3.5 | 0.5 | 0.2 |
| Higher polymers | None | None | None |
| Tertiary butyl alcohol percent by weight | 6.9 | 1.0 | 3.7 |
| Water | Trace | Trace | Trace |
| Conversion as percent by weight of isobutylene fed per pass | 30.0 | 8.88 | 6.68 |
| Conversion to tertiary butyl alcohol | 7.4 | 5.03 | 3.32 |
| Yield of polymer as percent by weight of isobutylene fed per pass | 22.6 | 3.85 | 3.46 |
| Composition of polymer: | | | |
| Di-isobutylene percent by weight | 83.2 | 86.7 | 87.4 |
| Tri-isobutylene do | 16.8 | 13.3 | 12.6 |

It will be evident that by recirculation of the unreacted olefin substantially complete conversion of the tertiary olefin to polymer and alcohol may be effected, or by recirculation of both unreacted tertiary olefin and alcohol, polymer in substantially quantitative yield may be made the final product. Furthermore, by the use of butane-butene, or other mixtures containing both tertiary and secondary olefins, by recirculation of the unreacted olefin the proportion of secondary olefin may be increased to a point where interpolymerization between the two different types of olefins takes place in preference to selective polymerization of the tertiary olefin content. Various other modifications will be obvious.

It is thus apparent that our process offers many advantages over prior methods of operation. By carrying out the polymerization directly under catalytic conditions, the operation is greatly simplified and the handling of absorption products is dispensed with. By the use of acid-acting catalysts of relatively low concentrations control of the polymerization and production of useful polymers boiling in the gasoline range is facilitated. Contacting the olefin to be polymerized with acid at temperatures of about 150° C. to 350° C. permits the use of very short contact times which further reduce the formation of high boiling products. We may recover tertiary alcohol as a by-product or return it to the system and obtain higher polymer yields as economic considerations dictate. Our process is particularly adapted to continuous methods of operation and may be carried out to yield olefin containing hydrocarbons adapted to the preparation of secondary alcohols.

As many apparently widely different embodiments of this invention may be made without departing from the spirit and scope thereof, it is to be understood that we do not limit ourselves to the details and theories of operation described, except as defined by the following claims.

We claim as our invention:

1. In the manufacture of higher boiling polymers by the direct hydration process of olefins, the steps which comprise contacting tertiary olefin containing hydrocarbon at a temperature above 100° C. but below 350° C. with an aqueous acid-acting catalyst, of a concentration between 0.5 and 50% for a time of 0.34 to 3.2 minutes the period of time being such that the reacted tertiary olefin is converted predominantly to polymer.

2. In the manufacture of higher boiling polymers by the direct hydration process of olefins, the steps which comprise contacting tertiary olefin containing hydrocarbon with an aqueous mineral acid solution containing between 0.5 and 50% acid by weight at a temperature between about 125° C. and 350° C. and under a pressure greater than atmospheric for a time of at least 0.34 minute, the period of time being such that the reacted tertiary olefin is converted predominantly to polymer.

3. In the manufacture of di-isobutylene by the direct hydration process of olefins, the steps which comprise contacting isobutylene with an aqueous sulfuric acid solution containing between 0.5 and 50% acid by weight at about 125° C. to about 350° C. and under a pressure greater than atmospheric and for a time of 0.34 to 3.2 minutes, the period of time being such that the reacted isobutylene is converted predominantly to polymer.

4. In the manufacture of higher boiling polymers by the direct hydration process of olefins, the steps which comprise continuously contacting the tertiary olefin and water under superatmospheric pressure with an aqueous acid-acting catalyst of 1 to 25% concentration at an elevated temperature between 150° and 250° C. and for a time of at least 0.34 minute, the period of time being such that the reacted tertiary olefin is converted predominantly to polymer, continuously withdrawing hydrocarbon and water at a rate equivalent to the rate of feed, separating the resulting tertiary olefin polymer and returning at least the aqueous part of the withdrawn material to the polymerizing system.

5. In the manufacture of higher boiling polymers by the direct hydration process of olefins, the steps which comprise feeding a tertiary olefin and the corresponding tertiary alcohol and water to a polymerizer containing an aqueous acid-acting catalyst of 1 to 25% concentration at a temperature between 150° and 250° C. and for a time of at least 0.34 minute, the period of time being such that the reacted tertiary olefin is converted predominantly to polymer, and withdrawing tertiary olefin polymerization products from the polymerizer, substantially as fast as formed.

6. In the manufacture of higher boiling polymers by the direct hydration process of olefins, the steps which comprise continuously contacting tertiary olefin with an aqueous solution of a mineral acid of 1 to 25% concentration at an elevated temperature between 150° and 250° C. for a time of at least 0.34 minute, the period of time being such that the reacted tertiary olefin is converted predominantly to polymer, continuously withdrawing the reaction products together with unreacted olefin and water, substantially totally condensing the withdrawn material, stratifying the condensate into an aqueous and a hydrocarbon phase, returning the aqueous phase to the catalyst solution and recovering polymer from the hydrocarbon phase.

FRANKLIN A. BENT.
RUSSELL W. MILLAR.
SIMON N. WIK.